(12) United States Patent
Pickett

(10) Patent No.: US 10,989,171 B2
(45) Date of Patent: Apr. 27, 2021

(54) METHOD AND APPARATUS FOR STORAGE OF COMPRESSED AIR ENERGY AND THE RELEASE AND CONVERSION OF COMPRESSED AIR ENERGY

(71) Applicant: Solar Wind Energy Tower Inc., Annapolis, MD (US)

(72) Inventor: Ronald W Pickett, Wrightsville Beach, NC (US)

(73) Assignee: KiNRG, Inc., Annapolis, MD (US)

(*) Notice: Subject to any disclaimer, the term of this patent is extended or adjusted under 35 U.S.C. 154(b) by 0 days.

(21) Appl. No.: 16/437,499

(22) Filed: Jun. 11, 2019

(65) Prior Publication Data
US 2019/0376490 A1    Dec. 12, 2019

Related U.S. Application Data

(60) Provisional application No. 62/683,270, filed on Jun. 11, 2018, provisional application No. 62/683,724, filed on Jun. 12, 2018.

(51) Int. Cl.
*F03D 9/17*    (2016.01)
*F15B 1/027*    (2006.01)
*F15B 1/02*    (2006.01)

(52) U.S. Cl.
CPC ............... *F03D 9/17* (2016.05); *F15B 1/024* (2013.01); *F15B 1/027* (2013.01)

(58) Field of Classification Search
CPC .. F15B 1/027; F15B 1/024; F03D 9/17; F03D 9/28
See application file for complete search history.

(56) References Cited

U.S. PATENT DOCUMENTS

| | | | |
|---|---|---|---|
| 8,272,212 B2* | 9/2012 | Blieske | F03D 9/257 60/408 |
| 8,727,698 B1 | 5/2014 | Pickett | |
| 2010/0133903 A1* | 6/2010 | Rufer | F03G 6/001 307/22 |

* cited by examiner

*Primary Examiner* — Abiy Teka
(74) *Attorney, Agent, or Firm* — Laubscher & Laubscher, P.C.

(57) ABSTRACT

An apparatus for storing and releasing compressed air energy includes at least one hydraulic-to-compressed air converter and at least one hydraulic-to-electric converter, both connected with an accumulator, which has at least one compressed-air storage tank. When hydraulic pressure is passed to the hydraulic-to-compressed air converter, it is converted to high-pressure compressed air, stored in the accumulator and released to generate a hydraulic force to the hydraulic-to-electric converter or the hydraulic-to-compressed air converter to convert hydraulic energy to electric or compressed air energy, respectively. A method for storing and releasing compressed air energy includes receiving hydraulic energy from a wind turbine and converting it to compressed air energy, storing the compressed air energy within an accumulator that has at least one storage tank, and then releasing the compressed air energy to generate a hydraulic force and convert hydraulic energy to electric or compressed air energy.

7 Claims, 5 Drawing Sheets

METHOD AND APPARATUS FOR STORAGE OF COMPRESSED AIR ENERGY AND THE RELEASE AND CONVERSION OF COMPRESSED AIR ENERGY

This application is based on U.S. provisional application Nos. 62/683,270 and 62/683,724 filed Jun. 11, 2018 and Jun. 12, 2018, respectively.

BACKGROUND OF THE DISCLOSURE

The present disclosure relates to energy storage, and more particularly to compressed air energy storage.

Methods and apparatuses for capturing and using naturally occurring energy are known. Such methods include capturing kinetic energy created by wind, which is done through the use of wind turbines, or capturing solar energy, which involves harnessing sun rays and associated heat. Each method is used to convert the naturally occurring energy to electricity to be used with a range of items. Though harnessing natural elements has its advantages, it also has its drawbacks. For instance, wind can vary greatly from location to location and day to day, and sunlight is only available for a portion of each day. These issues can reduce the effectiveness of such energy because when the natural sources are not available, electricity might not be available.

To combat such issues, methods and apparatuses have been developed to harness energy when the natural energy sources are not readily available. For instance, the Pickett et al. U.S. Pat. No. 8,727,698, incorporated in its entirety herein by reference, discloses a tower and system for collecting wind energy. The tower includes a water injection system which adds moisture to hot, dry air forcing evaporative cooling to create cold air which falls generating a downdraft within the tower for wind collection. The wind is delivered to wind tunnels having turbines which charge a closed loop hydraulic system which drive generators to generate electricity when the wind passes through the turbines. Thus the tower and systems in Pickett harness surrounding air, whether or not wind is blowing, which results in more consistent electrical output.

Other methods for combatting the cyclical nature of natural energy sources involve energy storage. Kinetic energy from wind can be collected and stored in multiple ways, including battery storage, compressed air, and hydrogen fuel cells. Such storage methods, however, can be challenging and inefficient. Thus a new method and apparatus for storing energy derived from wind and other related sources is needed.

SUMMARY OF THE DISCLOSURE

Accordingly, it is an object of the present disclosure to provide an apparatus for storing and releasing compressed air energy. The apparatus includes at least one hydraulic-to-compressed air converter and at least one hydraulic-to-electric converter, both of which are connected with an accumulator which has at least one compressed-air storage tank. When hydraulic pressure is delivered to the hydraulic-to-compressed air converter, it is converted to high-pressure compressed air, stored in the accumulator and released to drive a hydraulic force to the hydraulic-to-electric converter or the hydraulic-to-compressed air converter to convert hydraulic energy to electric or compressed air energy, respectively.

In one embodiment, the apparatus further includes a controller connected with the hydraulic-to-electric converter and the hydraulic-to-compressed air converter. The controller senses data from either converter and controls the converters based on the data and desired operations.

In a second embodiment, the accumulator includes a hydraulic pump connected with the hydraulic-to-electric converter and the hydraulic-to-compressed air converter for creating a hydraulic force between the pump and the two converters.

It is yet another object of the present disclosure to provide a method for storing and releasing compressed air energy. First, hydraulic energy is received from a wind turbine and then converted to compressed air energy. The compressed air energy is stored within an accumulator that has at least one storage tank. When energy is needed, the compressed air energy is released to drive a hydraulic generator to create hydraulic energy which is converted to electric or compressed air energy.

In one embodiment, converting the hydraulic energy to compressed air energy includes passing low-pressure hydraulic energy to a hydraulic-to-compressed air converter to create high-pressure compressed air.

In another embodiment, hydraulic energy is first converted to electric energy prior to converting hydraulic energy to compressed air energy.

BRIEF DESCRIPTION OF THE FIGURES

Other objects and advantages of the disclosure will become apparent from a study of the following specification when viewed in the light of the accompanying drawing, in which.

DETAILED DESCRIPTION

Figure 1:
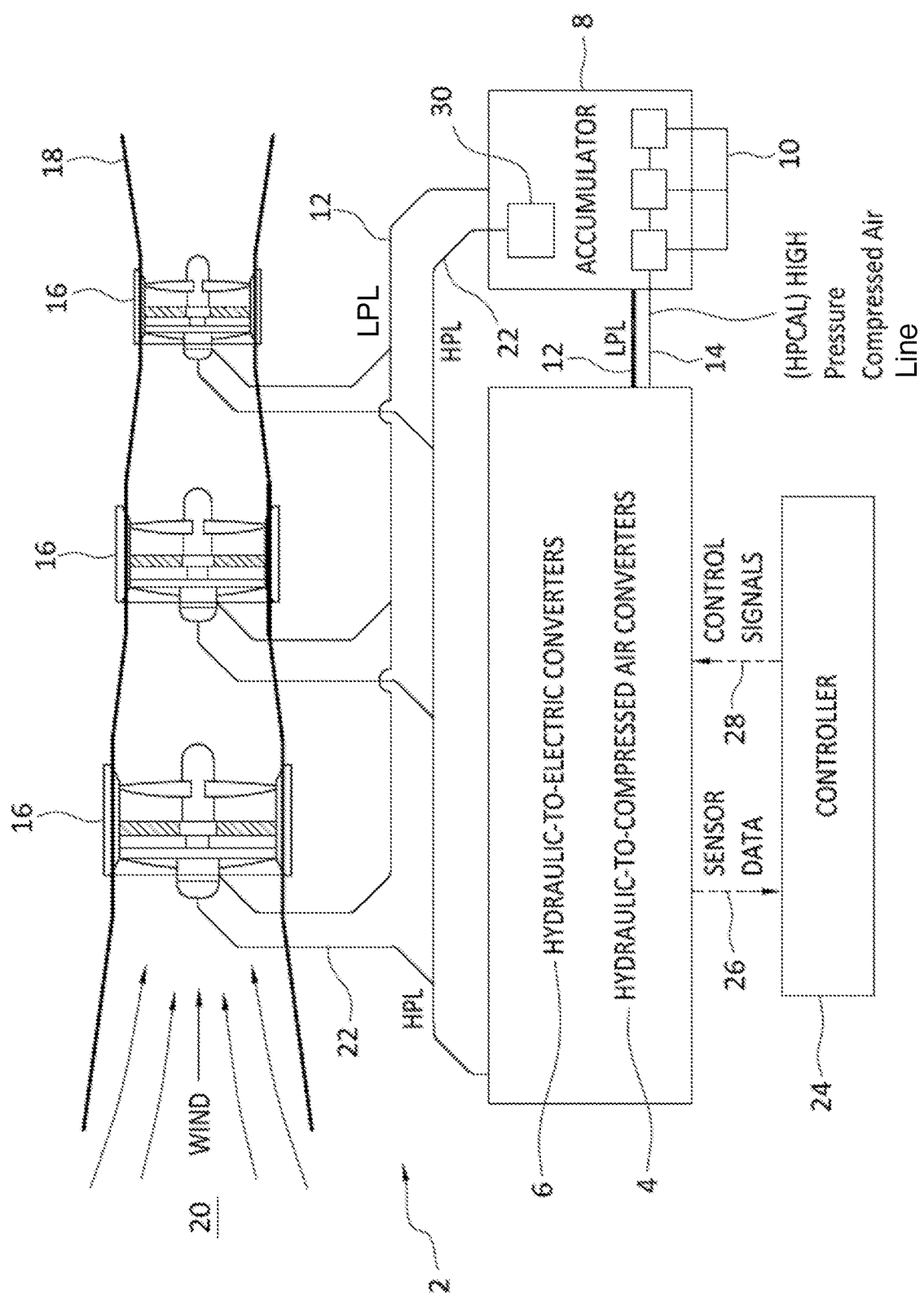
FIG. 1 is a schematic diagram of a first embodiment of the apparatus according to the present disclosure.
Figure 2:
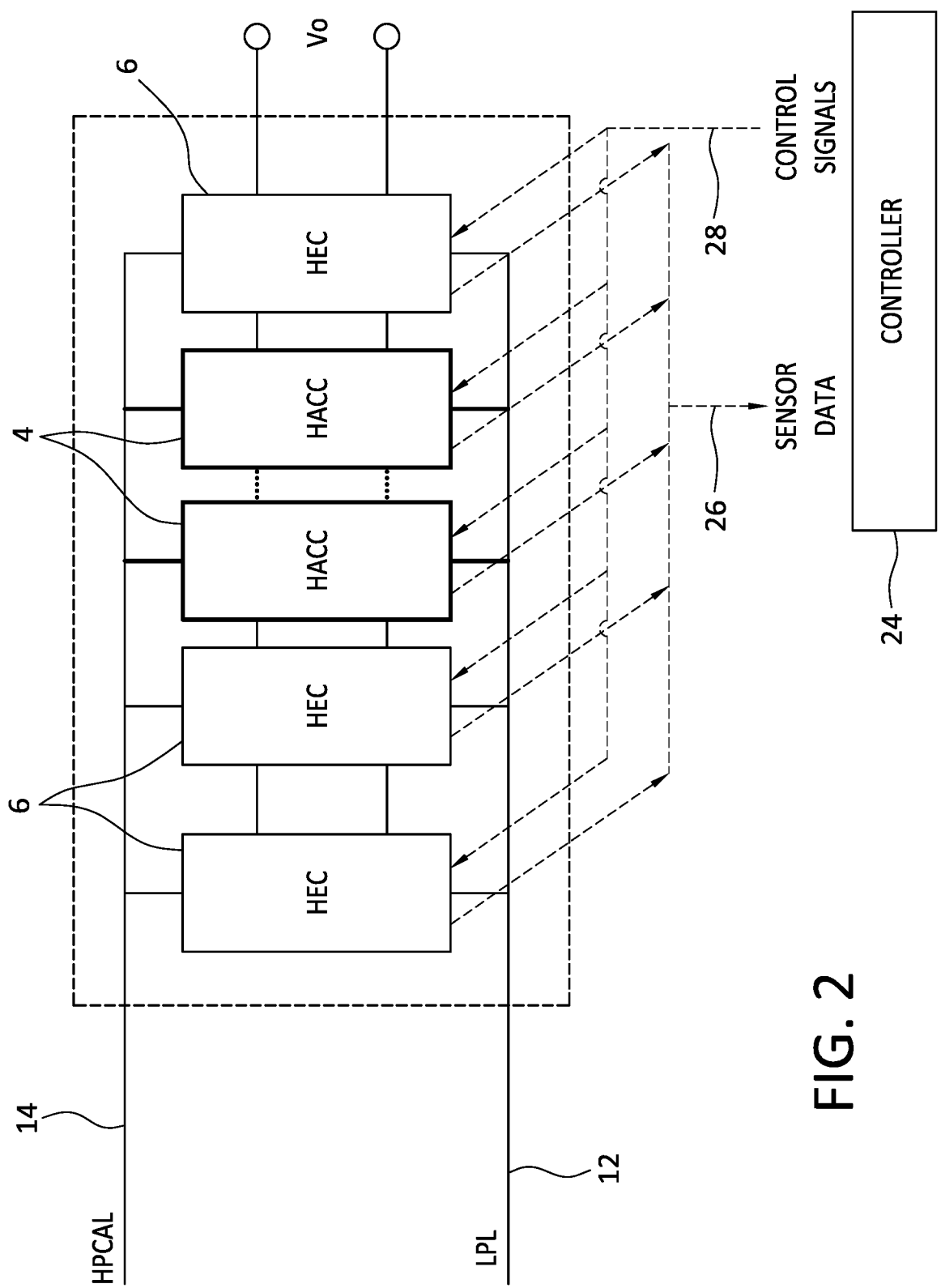
FIG. 2 is a schematic diagram of hydraulic convertors arranged according to one aspect of the present disclosure.

An apparatus and method according to the disclosure collects kinetic energy derived from wind and converts that energy to compressed air energy. FIGS. 1 and 2 show a preferred embodiment of such an apparatus 2. The apparatus includes hydraulic-to-compressed air converters ("HACC") 4, hydraulic-to-electric converters ("HEC") 6, and an accumulator 8 having three compressed-air storage tanks 10. The accumulator is connected with the hydraulic-to compressed air converters and the hydraulic-to-electric converters via a low-pressure hydraulic line ("LPL") 12 and via a high-pressure compressed air line ("HPCAL") 14.

FIG. 2 illustrates the hydraulic-to-electric converters 6 and the hydraulic-to-compressed air converters 4. When hydraulic pressure is passed through the low-pressure hydraulic line 12 to the hydraulic-to-compressed air converters, it is converted to high-pressure compressed air, passed through the high-pressure compressed air line 14 and stored in the storage tanks 10 which are shown in FIG. 1.

As shown in FIG. 1, the hydraulic pressure that is passed to the converters is created by wind turbines 16 arranged within a wind tunnel 18. The wind turbines are driven by the kinetic energy of wind 20. The low-pressure hydraulic line 12 and a high-pressure hydraulic line ("HPL") 22 are connected with the turbines, and when wind passes through the turbines, they rotate to push hydraulic pressure through the low-pressure line and/or high-pressure line to the converters.

Referring again to FIG. 2, in addition to the hydraulic-to-compressed air converters 4, there are hydraulic-to-electric converters 6. When hydraulic pressure is passed through the low-pressure hydraulic line 12, it can proceed to the hydraulic-to-electric converters 6 to create electric energy to be used at that time, or the hydraulic pressure passes to the hydraulic-to-compressed air converters 4 to create compressed air energy for storage and use at a later time.

As shown in FIGS. 1 and 2, a controller 24 is connected with the converters which collects data 26 from the converters and determines the amount of hydraulic energy that should be converted to electric or compressed air energy based on the hydraulic input from the wind and kinetic energy and the then-current electricity demand. The controller sends control signals 28 to the converters to operate them as needed. If the hydraulic input is high and the electricity demand is low, more hydraulic energy will be passed to the compressed air converters for energy storage. Alternatively, if demand is high and/or the hydraulic input is low, more hydraulic pressure will be converted to electrical energy for use at that time. It will be understood by those with skill in the art that the different converters may or may not be used separately or in combination depending on then-current electricity needs.

Referring to FIG. 1, compressed air that has been stored in the accumulator tanks 10 is used to drive a hydraulic pump 30 to create electricity when needed. The air is released to the pump, creating a hydraulic force that passes through a high-pressure hydraulic line 22 to the hydraulic-to-electric convertors 6 for conversion to electricity. Again, depending on the level of electricity needed, the controller 24 will either direct all of the hydraulic force to the electric converters 6, or if only a portion of the hydraulic force is needed, the controller will direct some of the that force to the compressed air converters 4 for storage and use at a later time.

Figure 3:
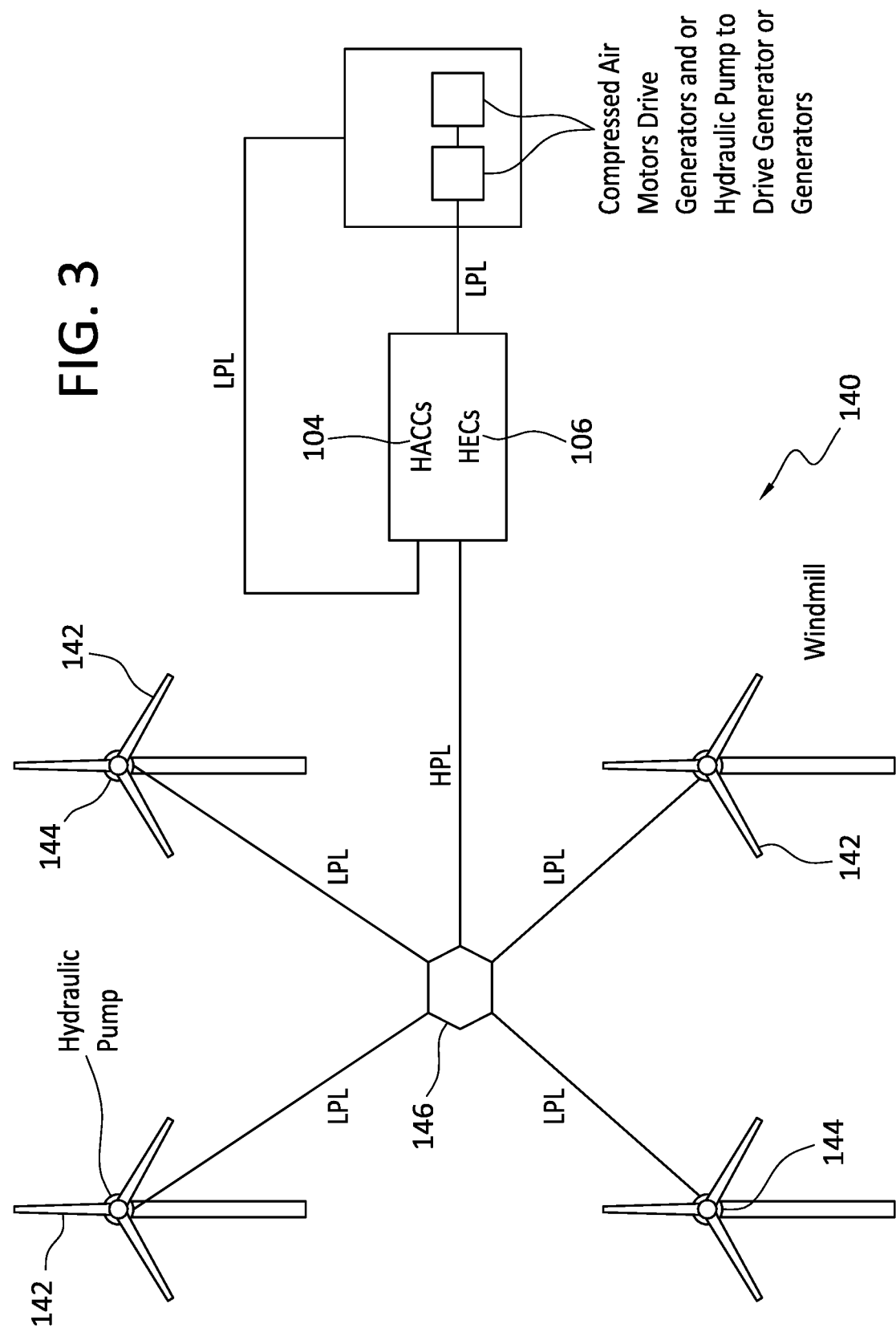
FIG. 3 is a schematic diagram of a wind farm for collecting and converting kinetic energy according to one aspect of the present disclosure.
Figure 4:
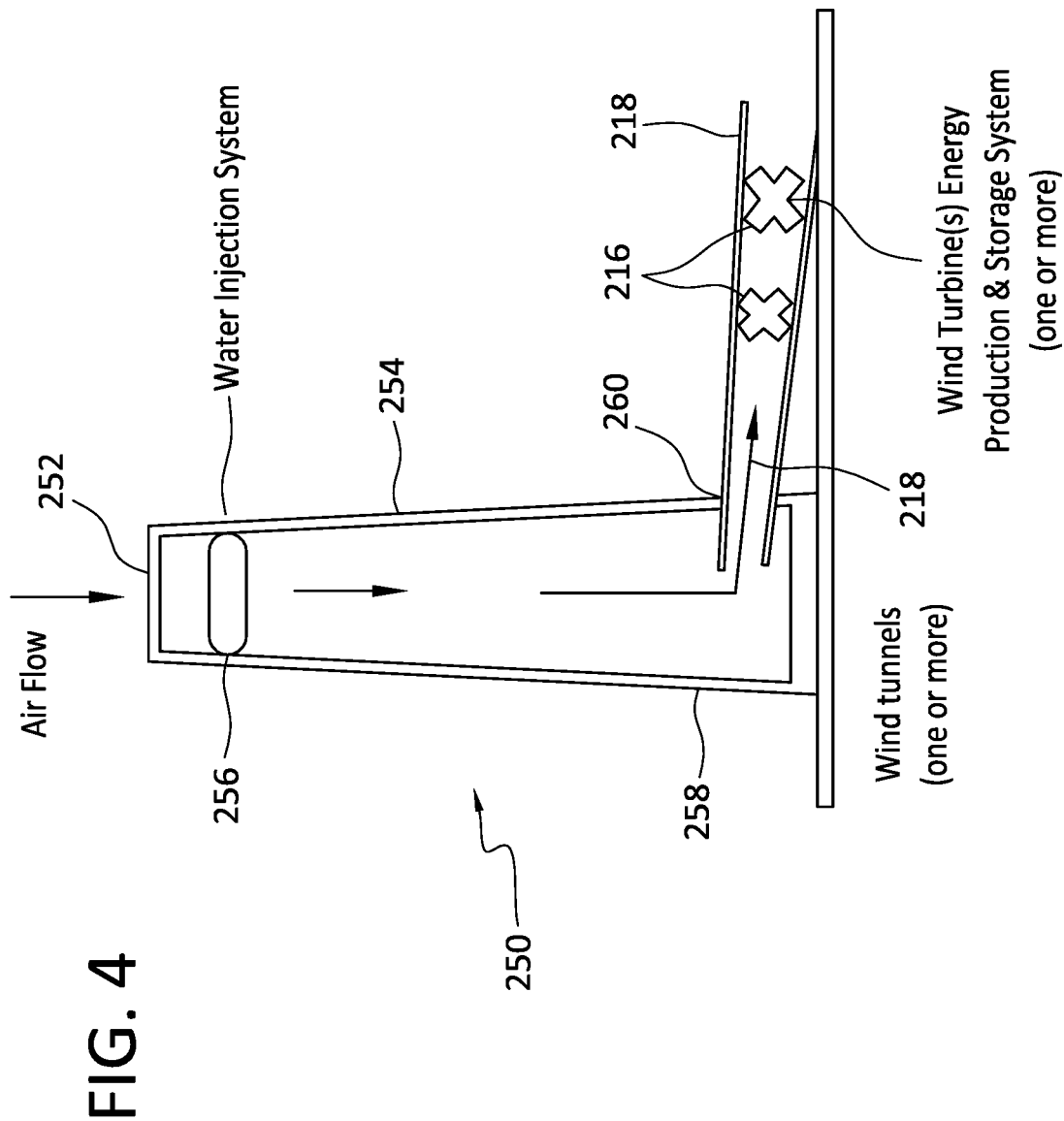
FIG. 4 is a schematic diagram of a repurposed smoke stack for collecting and converting kinetic energy according to another aspect of the present disclosure.

FIGS. 3 and 4 show kinetic energy collection systems that include apparatuses similar to those described above. FIG. 3 is a schematic diagram of a wind farm 140. The wind farm includes large windmills 142 which collect kinetic energy from wind to drive hydraulic pumps 144. The hydraulic pumps pass hydraulic pressure to a collector 146 for storage and use when needed. Hydraulic pressure is then passed to the hydraulic-to-electric convertors 106 and/or hydraulic-to-compressed air convertors 104 based on the then-current electricity needs.

Referring to FIG. 4, a tower and water injection system 250, such as that described in the Pickett et al. U.S. Pat. No. 8,727,698, is shown. Air flows into the top 252 of the tower 254 and is collected via the water injection system 256 which sprays water to hot, dry air forcing evaporative cooling to create cold air which falls causing a downdraft, forcing the air toward the lower end 258 of the tower. At the lower end of the tower there is an opening 260 connected with wind tunnel 218 that has wind turbines 216 which connect with hydraulic-to-electric converters and with hydraulic-to-compressed air converters (not shown), as described above. There can be multiple wind turbines and multiple converters depending on need and expected energy collection. The collected energy is either converted to electricity or compressed air energy as then-current needs require.

Figure 5:
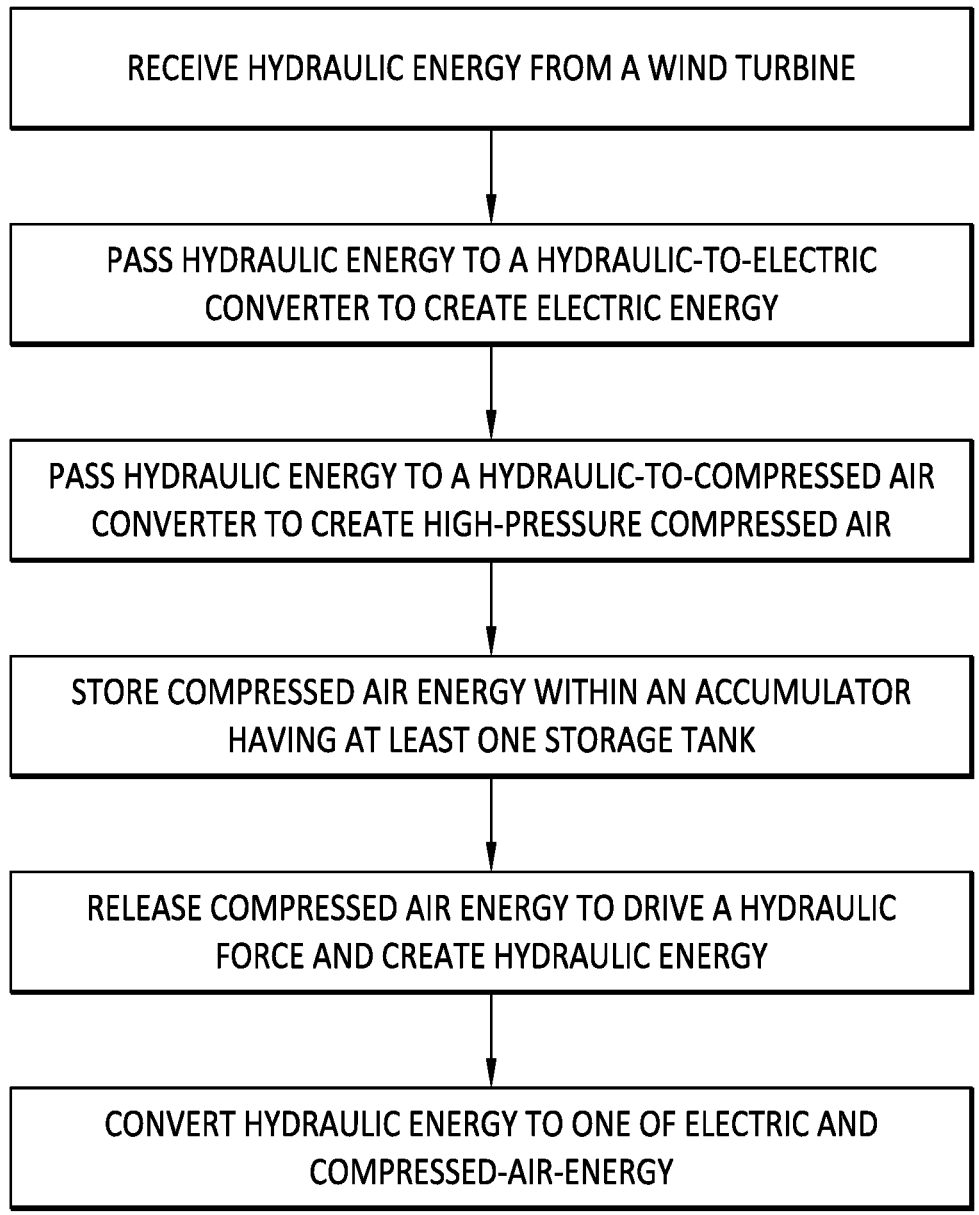
FIG. 5 is a flow chart of a method for storing and releasing compressed air energy according to one aspect of the present disclosure.

Referring now to FIG. 5, a method for storing and releasing compressed air energy will be described. First, hydraulic energy is created from a wind turbine and passed to a hydraulic-to-electric converter to create electrical energy. The hydraulic energy is then passed to a hydraulic-to-compressed air converter to create high-pressure compressed air. Alternatively, the hydraulic energy can bypass the hydraulic-to-electric converter and proceed directly to the hydraulic-to-compressed air converter, or be passed only to the hydraulic-to-electric converter. Once high-pressure compressed air is created, it is passed to an accumulator that has at least one storage tank. The compressed air is stored within the tanks for use at a later time. When needed, the compressed air is released to generate a hydraulic force and create hydraulic energy. The hydraulic energy is converted to either electric or compressed air energy, or both.

Although the above description is with reference to particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. An apparatus for storing and releasing compressed air energy, comprising:
   a. a device for capturing naturally occurring energy;
   b. at least one hydraulic-to-compressed air converter connected with said energy capturing device via a first high-pressure hydraulic line and a first low-pressure hydraulic line;
   c. at least one hydraulic-to-electric converter connected with said energy capturing device via said first high-pressure hydraulic line and said first low-pressure hydraulic line; and
   d. an accumulator including at least one compressed-air storage tank connected with said at least one hydraulic-to compressed air converter and said at least one hydraulic-to-electric converter via a high-pressure compressed air line, whereby when said device captures naturally occurring energy, one of high pressure and low pressure hydraulic energy is supplied to one of said at least one hydraulic-to-electric converter and at least one hydraulic-to-compressed air converter to convert hydraulic energy to one of electric and compressed air energy, respectively, and stored in said accumulator.

2. An apparatus as defined in claim 1, and further comprising a controller connected with said at least one hydraulic-to-electric converter and at least one hydraulic-to-compressed air converter.

3. An apparatus as defined in claim 1, wherein said accumulator further includes a hydraulic pump connected with said at least one hydraulic-to-electric converter and at least one hydraulic-to-compressed air converter.

4. An apparatus as defined in claim 1, wherein said at least one hydraulic-to-compressed air converter is connected with a hydraulic force via a low-pressure hydraulic line.

5. An apparatus as defined in claim 1, wherein said energy capturing device comprises at least one wind turbine.

6. An apparatus as defined in claim 5, wherein said wind turbine is one of a wind farm wind turbine and an energy tower wind turbine.

7. An apparatus for storing and releasing compressed air energy as defined in claim 5, wherein said energy capturing device further comprise a wind tunnel, said wind turbine being arranged in said wind tunnel.

\* \* \* \* \*